(12) United States Patent
Hagiwara

(10) Patent No.: US 9,239,919 B2
(45) Date of Patent: Jan. 19, 2016

(54) AUTHENTICATION PROCESSING DEVICE FOR PERFORMING AUTHENTICATION PROCESSING

(71) Applicant: CASIO COMPUTER CO., LTD., Tokyo (JP)

(72) Inventor: Shinichi Hagiwara, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/221,019

(22) Filed: Mar. 20, 2014

(65) Prior Publication Data
US 2014/0289841 A1    Sep. 25, 2014

(30) Foreign Application Priority Data

Mar. 22, 2013    (JP) .................................. 2013-060091

(51) Int. Cl.
| | | |
|---|---|---|
| *G06F 12/00* | (2006.01) | |
| *G06F 9/00* | (2006.01) | |
| *G06F 21/44* | (2013.01) | |

(52) U.S. Cl.
CPC ..................................... *G06F 21/44* (2013.01)

(58) Field of Classification Search
CPC ....................................................... G06F 21/44
USPC .............. 726/15, 16, 18, 19, 20, 22; 711/100; 365/232
See application file for complete search history.

(56) References Cited

U.S. PATENT DOCUMENTS

| | | | | |
|---|---|---|---|---|
| 6,915,248 B1 * | 7/2005 | Ip | ......................... | G06F 17/5022 703/14 |
| 7,079,670 B2 * | 7/2006 | Pan | ..................... | G06K 9/00087 235/380 |
| 7,257,834 B1 * | 8/2007 | Boydstun | ................ | G06F 21/31 707/999.009 |
| 8,553,266 B2 * | 10/2013 | Chiba | ................ | H04N 1/00204 358/1.13 |
| 2006/0126422 A1 * | 6/2006 | Takagi | ................ | G06F 12/1433 365/232 |
| 2007/0079051 A1 * | 4/2007 | Tanaka | .................... | G06F 21/51 711/100 |

(Continued)

FOREIGN PATENT DOCUMENTS

JP        2000-339084 A    12/2000

*Primary Examiner* — Abu Sholeman
(74) *Attorney, Agent, or Firm* — Fitch Even Tabin & Flannery LLP

(57) ABSTRACT

The present invention is to enable a user to input authentication information without burden, such that the user only has to memorize part of the authentication information even when inputting lengthy authentication information in order to ensure high-level security. When an operation of inputting and arranging authentication information in an information arrangement region is performed in a state where an arrangement status of a specified portion in the information arrangement region is set in advance as partial-authentication reference information in a reference authentication information memory, a CPU detects an arrangement status of the specified portion from an overall arrangement status in the information arrangement region, and performs, as partial authentication, processing of matching the detected arrangement status of the specified portion and the arrangement status of the specified portion set as the partial-authentication reference information.

12 Claims, 10 Drawing Sheets

(56) References Cited

U.S. PATENT DOCUMENTS

| | | | | |
|---|---|---|---|---|
| 2008/0065880 A1* | 3/2008 | Martin | ............... | H04L 63/123 713/156 |
| 2009/0249014 A1* | 10/2009 | Obereiner | ............ | G06F 12/1441 711/164 |
| 2010/0052851 A1* | 3/2010 | Kaehler | ............... | G06F 3/017 340/5.81 |
| 2011/0219436 A1* | 9/2011 | Tonegawa | ............... | H04L 12/58 726/5 |
| 2012/0159615 A1* | 6/2012 | Griffin | ............... | H04L 9/3226 726/19 |
| 2013/0136320 A1* | 5/2013 | Nishiguchi | ........ | G06K 9/00295 382/118 |
| 2013/0283035 A1* | 10/2013 | Tomlinson | ............ | H04L 9/3231 713/150 |
| 2014/0082724 A1* | 3/2014 | Pearson | ............... | G06F 21/57 726/22 |
| 2014/0279493 A1* | 9/2014 | Kamath | ............... | H04L 63/08 705/43 |
| 2014/0304773 A1* | 10/2014 | Woods | ............... | H04L 63/08 726/3 |
| 2015/0019424 A1* | 1/2015 | Pourfallah | ............ | G06Q 40/02 705/43 |
| 2015/0101031 A1* | 4/2015 | Harjanto | ............ | H04L 63/0876 726/7 |
| 2015/0150084 A1* | 5/2015 | Kiperberg | ............... | G06F 21/44 726/3 |
| 2015/0172286 A1* | 6/2015 | Tomlinson | .......... | H04L 63/0861 726/7 |
| 2015/0235018 A1* | 8/2015 | Gupta | ............... | G06F 21/36 726/19 |

* cited by examiner

FIG. 4

3c REFERENCE AUTHENTICATION INFORMATION MEMORY

| TOTAL NUMBER OF DIGITS (PREDETERMINED NUMBER OF PIECES) NINE DIGITS | REFERENCE AUTHENTICATION INFORMATION 538916274 | | 3c1 OVERALL AUTHENTICATION REGION |
|---|---|---|---|
| ARRANGEMENT AREA (A) | INFORMATION CONTENT (1:EXCLUSION) | | 3c2 ARRANGEMENT EXCLUSION CONFIRMATION REGION |
| ⋮ | ⋮ | | |
| ARRANGEMENT ORDINAL LEVEL (1) | ARRANGEMENT AREA (G) | INFORMATION CONTENT (5) | |
| ARRANGEMENT ORDINAL LEVEL (2) | ARRANGEMENT AREA (F) | INFORMATION CONTENT (6) | 3c3 PARTIAL AUTHENTICATION REGION |
| ARRANGEMENT ORDINAL LEVEL (3) | ARRANGEMENT AREA (B) | INFORMATION CONTENT (7) | |
| ⋮ | ⋮ | | |

FIG. 5

3d INFORMATION ARRANGEMENT MEMORY

| ARRANGEMENT ORDINAL LEVEL (OVERALL RANK) | INFORMATION CONTENT | ARRANGEMENT AREA |
|---|---|---|
| No. 1 | 5 | G |
| No. 2 | 3 | H |
| No. 3 | 8 | I |
| No. 4 | 9 | D |
| No. 5 | 1 | E |
| No. 6 | 6 | F |
| No. 7 | 2 | A |
| No. 8 | 7 | B |
| No. 9 | 4 | C |

3e PARTIAL AUTHENTICATION METHOD MEMORY

| TYPE | PARTIAL AUTHENTICATION METHOD | SELECTED |
|---|---|---|
| 1 | ARRANGEMENT AREA, INFORMATION CONTENT, AND ARRANGEMENT ORDINAL LEVEL (PARTIAL RANK) | ◎ |
| 2 | ARRANGEMENT AREA AND ARRANGEMENT ORDINAL LEVEL (PARTIAL RANK) | |
| 3 | INFORMATION CONTENT AND ARRANGEMENT ORDINAL LEVEL (PARTIAL RANK) | |
| 4 | ARRANGEMENT AREA, INFORMATION CONTENT, AND ARRANGEMENT ORDINAL LEVEL (OVERALL RANK) | |
| 5 | ARRANGEMENT AREA AND ARRANGEMENT ORDINAL LEVEL (OVERALL RANK) | |
| 6 | INFORMATION CONTENT AND ARRANGEMENT ORDINAL LEVEL (OVERALL RANK) | |
| 7 | ARRANGEMENT AREA AND INFORMATION CONTENT | |

AUTHENTICATION PROCESSING DEVICE FOR PERFORMING AUTHENTICATION PROCESSING

CROSS-REFERENCE TO RELATED APPLICATION

This application is based upon and claims the benefit of priority from the prior Japanese Patent Application No. 2013-060091, filed Mar. 22, 2013, the entire contents of which are incorporated herein by reference.

BACKGROUND OF THE INVENTION

1. Field of the Invention

The present invention relates to an authentication processing device which performs authentication processing according to inputted authentication information.

2. Description of the Related Art

In general, in an information processing device such as a PC (personal computer), a tablet terminal device, or a portable terminal device, when authentication processing such as identity verification is performed, a passphrase with a large number of characters is used, among passwords (authentication information) for use in authentication, whereby high-level security can be achieved and a significant reduction of the danger of violating authentication can be expected. However, the large number of characters disadvantageously makes it difficult for a user to remember the passphrase.

To overcome this disadvantage, a technology has been conventionally provided in which, even if a four-digit password is used, security can be enhanced by setting the input positions and the input sequence of characters in the password in advance (refer to Japanese Patent Application Laid-Open (Kokai) Publication No. 2000-339084).

In the above-described technology, in the case of a password with a large number of digits such as a passphrase, a user has to memorize the input positions and the input sequence of the digits and input the password by recalling the input position and the input sequence for each digit. This puts a great burden on the user. Conversely, when the number of digits of the password is small, if a third party steals a glance at or secretly photographs the password with the last digit inputted, there is a danger that authentication is violated after repeating input errors several times.

SUMMARY OF THE INVENTION

The present invention is to enable a user to input authentication information without burden, such that the user only has to memorize part of the authentication information even when inputting lengthy authentication information in order to ensure high-level security.

An object of the present invention is to provide an authentication processing device which performs authentication processing in response to an operation of inputting and arranging a predetermined number of pieces of information forming authentication information in a predetermined arrangement region, the device comprising: a setting section which sets, as authentication reference information, an arrangement status in an arbitrarily specified portion by an information arrangement status in the predetermined arrangement region; a detecting section which detects an arrangement status of the specified portion from an overall arrangement status in the predetermined arrangement region when the operation of inputting and arranging the predetermined number of pieces of information forming the authentication information in the predetermined arrangement region is performed; and a partial authenticating section which performs processing, as partial authentication, of matching the arrangement status of the specified portion detected by the detecting section and the arrangement status of the specified portion set as the reference information by the setting section.

According to the present invention, even when inputting lengthy authentication information is inputted in order to ensure high-level security, the user only has to memorize part of the authentication information, and whereby the user can input the authentication information without burden. Thus, both security and operability can be satisfied.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4 is a diagram for describing a reference authentication information memory $3c$;

FIG. 5 is a diagram for describing an information arrangement memory $3d$;

FIG. 6 is a diagram for describing a partial authentication method memory $3e$;

DETAILED DESCRIPTION OF THE PREFERRED EMBODIMENTS

An embodiment of the present invention will hereinafter be described with reference to FIG. 1 to FIG. 10.

Figure 1:
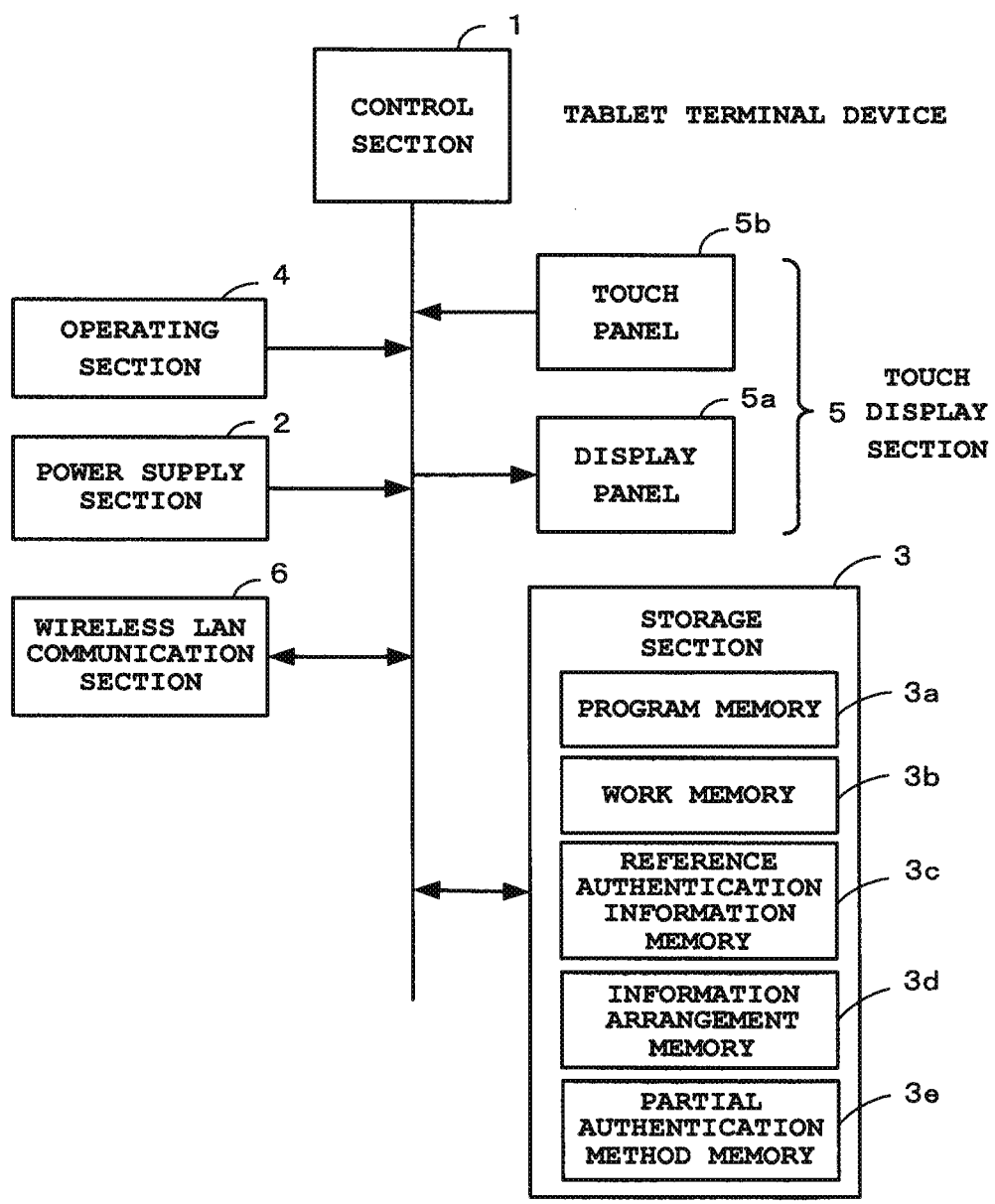
FIG. 1 is a block diagram of basic components of a tablet terminal device in which the present invention has been applied as an authentication processing device.

FIG. 1 is a block diagram of basic components of a portable terminal device (tablet terminal device) in which the present invention has been applied as an authentication processing device.

A CPU 1 is a central processing unit which operates with power supplied from a power supply section (secondary battery) 2 and controls the entire operation of this tablet terminal device according to various programs in a storage section 3. The storage section 3 is structured to include, for example, a ROM (Read Only Memory) and a flash memory. The storage section 3 further includes a program memory $3a$ which stores a program and various applications for achieving the present embodiment according to operation procedures depicted in FIG. 7 to FIG. 10, a work memory 3b which temporarily stores various information (for example, a flag) required for this tablet terminal device to operate, a reference authentication information memory 3c, an information arrangement memory 3d, and a partial authentication method memory 3e, which will be described further below.

The storage section 3 may be structured to include, for example, a removable portable memory (recording medium) such as an SD (Secure Digital) card or an IC (Integrated Circuit) card and, although not shown, may be structured to include a storage region on a predetermined server device side in a state where the storage section 3 is connected to a network via a communication function. An operating section 4 includes a power supply key for turning power supply ON/OFF as a push-button key, although not shown. A touch display section 5 forms a touch screen such that a touch panel 5b is arranged to be laminated on a display panel 5a. Note that, although a capacitive type or a resistive film type is adopted in this embodiment, another type may be adopted.

Also note that a touch operation is not limited to a contact operation by a finger or pen making direct contact with the touch panel 5b, and may include, for example, as an operation similar to the contact operation, a non-contact operation for which the position of a finger or pen is detected based on changes in capacitance or brightness due to the approach or the approach and movement of the finger or pen.

That is, the touch panel is not limited to be of a contact-type touch panel which detects a contact operation but may be a non-contact-type touch panel or an operation detecting device which detects a non-contact operation. In the present embodiment, however, the case of a contact operation on the contact-type touch panel is exemplarily described as the touch operation. A wireless LAN (Local Area Network) communication section 6 is a wireless communication module that can perform high-speed large-capacity communication and can be connected to the Internet via a nearest wireless LAN router (not shown).

Figure 2:
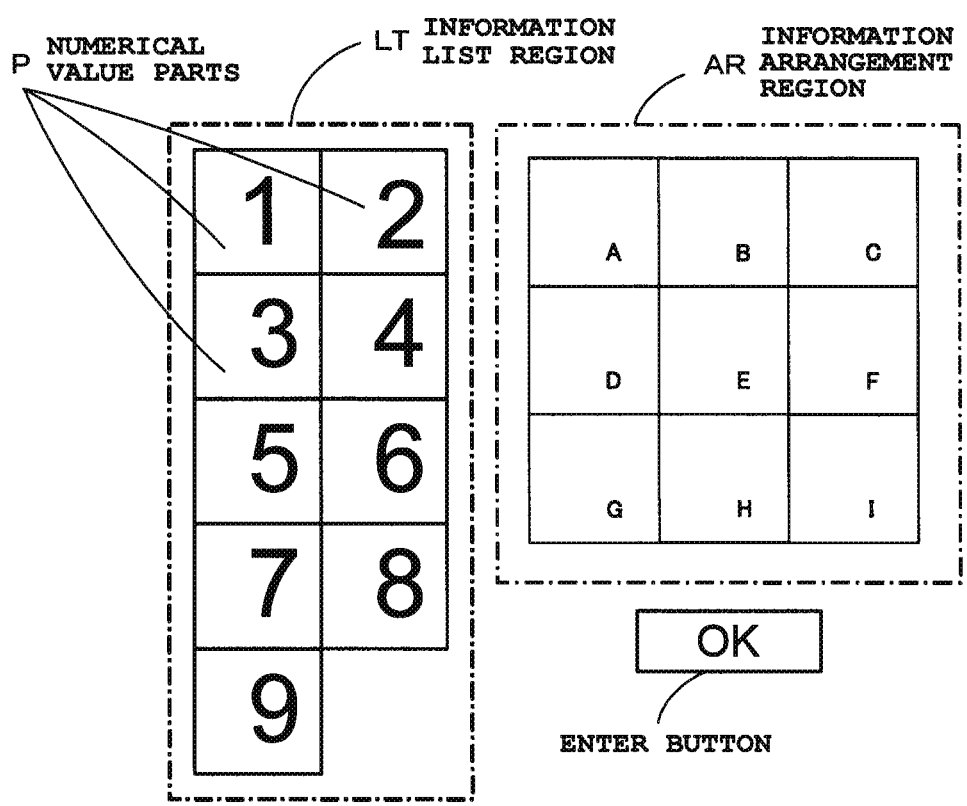
FIG. 2 is a diagram of an input screen when authentication information is inputted and arranged on a touch display section 5.

FIG. 2 is a diagram of an input screen when authentication information is inputted and arranged on the touch display section 5.

An authentication information input screen on the touch display section 5 has an information list region LT and information arrangement region AR for use in inputting authentication information and the like. The information list region LT is a screen for list display of information of each digit (in the depicted example, numerical values from "1" to "9") forming authentication information of a plurality of digits. Each of the numerical value "1" to "9" is formed of a movable rectangular small piece portion (a numerical value part) P.

Here, as selecting any numerical value part P from among the numerical value parts P from "1" to "9", the user performs a touch operation corresponding to a drag-and-drop mouse operation (an operation of moving while touching and then leaving) to move the numerical value part P. In this manner, the user arranges the selected numerical value parts P one after another in any areas on the information arrangement region AR to sequentially input authentication information.

The information arrangement region AR is adjacent to the information list region LT, and has rectangular areas A to I obtained by sectioning in, for example, a three-by-three matrix. These rectangular areas A to I are arrangement areas where the numerical value parts P moved from the information list region LT by the drag-and-drop operation are arranged. On a lower side of the information arrangement region AR, an enter button (a touch key) "OK" is arranged, which is operated when authentication information of all digits are completely inputted (arranged).

In FIG. 2, information of nine digits in a numerical value string is exemplarily described as the authentication information (passphrase). However, the number of digits may be more than nine. Also, the authentication information is not limited to numerical values, but may include alphabetic characters.

Figure 3A:
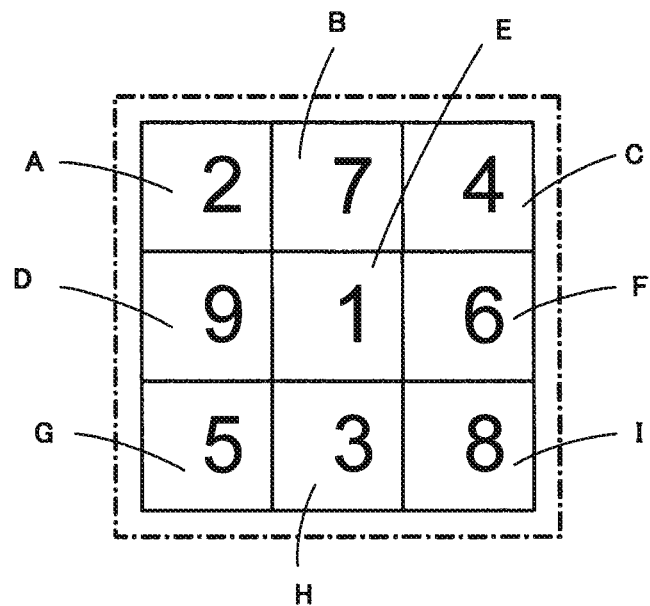
FIG. 3A is a diagram of a state where all numerical values of nine digits are arranged in the input screen as authentication information.

FIG. 3A is a diagram exemplarily depicting a state where the all numerical values P from "1" to "9" are arranged in the arrangement areas A to I forming the information arrangement region AR.

In the example of FIG. 3A, the numerical value of "2" is arranged in the arrangement area A on the first row and first column, the numerical value of "7" is arranged in the arrangement area B on the first row and second column, the numerical value of "4" is arranged in the arrangement area C on the first row and third column, the numerical value of "9" is arranged in the arrangement area D on the second row and first column, the numerical value of "1" is arranged in the arrangement area E on the second row and second column, the numerical value of "6" is arranged in the arrangement area F on the second row and third column, the numerical value of "5" is arranged in the arrangement area G on the third row and first column, the numerical value of "3" is arranged in the arrangement area H on the third row and second column, and the numerical value of "8" is arranged in the arrangement area I on the third row and third column.

Figure 3B:
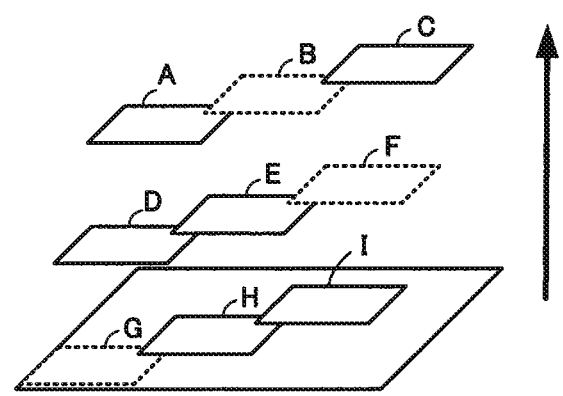
FIG. 3B is a diagram schematically depicting an arrangement sequence when numerical values of nine digits in a string are arranged one after another each with a time delay.

FIG. 3B is a diagram schematically depicting an arrangement sequence when nine numerical value parts P are arranged one after another each with a time delay. An arrow in FIG. 3B indicates a chronological order as an arrangement sequence (a so-called Z-order front-back relation).

In the example of FIG. 3B, firstly, the numerical values of "5", "3", and then "8" are sequentially arranged in the arrangement areas G, H, and I, respectively. Next, the numerical values of "9", "1", and then "6" are sequentially arranged in the arrangement areas D, E, and F, respectively. Furthermore, the numerical values of "2", "7", and then "4" are sequentially arranged in the arrangement areas A, B, and C, respectively. In this manner, in the information arrangement region AR, pieces of information can be arranged in a three-dimensional coordinate system with a column direction being taken as a Y axis, a row direction being taken as an X axis, and a Z-order front-back direction being taken as a Z axis.

FIG. 4 is a diagram for describing the reference authentication information memory 3c.

The reference authentication information memory 3c is a memory which stores matching-reference authentication information (reference information) arbitrarily set in advance by user operation, and has an overall authentication region 3c1, an arrangement exclusion confirmation region 3c2, and a partial authentication region 3c3.

The overall authentication region 3c1 is a region for storing all digits (for example, nine digits) as matching-reference authentication information for performing overall authentication (overall-authentication reference information, or a reference password). The CPU 1 sequentially matches and compares, for each digit, authentication information for all digits inputted and arranged on the information arrangement region AR and the reference information for all digits arbitrarily set in advance in this overall authentication region 3c1 to perform authentication processing (overall authentication) such as identity verification.

As a result of overall authentication, if the information for all digits including their sequence coincides with that of the reference information, authentication OK (positive) is judged. If there is a difference regarding even one digit, authentication NG (negative) is judged. In the example of FIG. 4, "538916274" is set as overall-authentication reference information.

The arrangement exclusion confirmation region 3c2 is a region where information is set indicating that it is excluded to input and arrange information arbitrarily specified in advance in an arrangement area arbitrarily specified in advance. For example, the information is set indicating that the input of the numerical value in the arrangement area A is regarded as valid, when the numerical value other than the numerical value of "1" is inputted, but the input of the numerical value of "1" therein is regarded as invalid, when the numerical value of "1" is inputted.

In the arrangement exclusion confirmation region 3c2, the information indicating arrangement exclusion is not limited to one type, but a plurality of types of arrangement exclusion may be set. Also, the setting is not limited to the case where one arrangement area and one target numerical value are set, but may be such that one arrangement area and two target numerical values may be set. Furthermore, the target numerical value is not limited to a target numerical value whose input is regarded as invalid, but may be a numerical value whose input is regarded as valid. In the example described above, numerical values other than the numerical value of "1" may be set.

The partial authentication region 3c3 is a region where matching-reference authentication information for performing partial authentication (partial-authentication reference information), which is a concept opposed to the above-described overall authentication, is arbitrarily set in advance by user operation. Here, in the present embodiment, partial authentication is authentication processing started on condition that the processing result is judged as negative (authentication NG) as a result of the above-described overall authentication. By an information arrangement status in the information arrangement region AR, the arrangement status in a specified portion (a plurality of arrangement areas) arbitrarily specified by user operation is set in the partial authentication region 3c3 as partial-authentication reference information.

In a state where information (numerical values) is inputted and arranged in all arrangement areas A to I of the information arrangement region AR at the time of the above-described overall authentication, the CPU 1 detects the arrangement status of the specified portion of the information arrangement region AR, and performs partial authentication processing, in which matching and comparison are performed to judge whether the detected arrangement status coincides with the arrangement status set in the partial authentication region 3c3 as partial-authentication reference information.

That is, the partial authentication region 3c3 is a region for storing the arrangement status of a portion from an overall arrangement status included in the overall-authentication reference information as partial-authentication reference information, and has items of "information content", "arrangement area", and "arrangement ordinal level" as elements indicating the arrangement status.

"Information content" is an item in which information with a plurality of digits (for example, three digits), smaller in number than the overall-authentication reference information (the total number of digits: nine digits), are set as information serving as targets for partial authentication.

"Arrangement area" is an item in which a plurality of (for example, three) arrangement areas, smaller in number than the digits of the overall-authentication reference information (the total number of digits: nine digits), are set as information serving as target areas for partial authentication from an overall arrangement status included in the overall-authentication reference information.

"Arrangement ordinal level" is an item in which the following area arrangement ordinal levels are set: an arrangement ordinal level for information indicating at which ordinal level the information set in "information content" is arranged; or an arrangement ordinal level for area indicating at which ordinal level any information is arranged in the area set in "arrangement area".

In the example of FIG. 4, information of any three digits (numerical values of "5", "6", and "7") from among nine digits forming the overall-authentication reference information is taken as a partial authentication target, and the arrangement status defining the following is set as partial-authentication reference information: among these pieces of information of three digits, the numerical value of "5" is initially (firstly) arranged in the arrangement area G, the numerical value of "6" is next (secondly) arranged in the arrangement area F, and the numerical value of "7" is lastly (thirdly) arranged in the arrangement area B.

As a matter of course, the information serving as a partial authentication target is not limited to the numerical values of "5", "6", and "7", and any information can be set. Furthermore, the information may have two digits, four digits, or the like. Similarly, the arrangement areas are not limited to G, F, and B, and any areas can be set.

As described above, in the partial authentication region 3c3, the elements of "information content", "arrangement area", and "arrangement ordinal level" indicating an arrangement status of a part in the information arrangement region AR can be set in association with each other as partial-authentication reference information. Alternatively, any two of these elements may be combined and set as partial-authentication reference information.

For example, in the information of three digits, when a combination of "arrangement area" and "arrangement ordinal level" in association with each other is set as partial-authentication reference information, an arrangement status defining that any information is initially arranged in the arrangement area G, any other information is next arranged in the arrangement area F, and any other information is lastly arranged in the arrangement area B regardless of "information content" is set as partial-authentication reference information.

Also, in the case of a combination of "information content" and "arrangement ordinal level" in association with each other, an arrangement status defining that the numerical value of "5" is initially arranged, the numerical value of "6" is next arranged, and the numerical value of "7" is lastly arranged regardless of "arrangement area" is set as partial-authentication reference information.

Furthermore, in the case of a combination of "information content" and "arrangement area" in association with each other, an arrangement status defining that the numerical value "5" is arranged in the arrangement area G, the numerical value "6" is arranged in the arrangement area F, and the numerical value "7" is arranged in the arrangement area B regardless of "arrangement ordinal number" is set as partial-authentication reference information.

The above-described "arrangement ordinal level" indicates a partial rank indicating an ordinal level of each target in an alignment of the partial authentication targets included in "information content" or "arrangement area". For example, as an arrangement ordinal level in the information of any three digits (for example, the numerical values "5", "6", and "7") among nine digits in total, the arrangement ordinal level indicates an ordinal level (any of a first to third levels) in three numerical values "5", "6", and "7" (a partial rank).

In this partial rank, for example, even if an overall rank of the numerical value of "5" is a sixth level, the numerical value of "5" is at a first level among the numerical values of "5", "6", and "7" in the partial-authentication target, regardless of the overall rank. While the partial rank is taken as partial-authentication reference information in the above-described example of "arrangement ordinal level", the present invention is not limited thereto. As "arrangement ordinal level", an overall rank may be taken indicating an ordinal level of each partial authentication target included in "information content" or "arrangement area" in an alignment of a predetermined total number of pieces of authentication information as a whole.

For example, as "arrangement ordinal level", an overall rank may be taken indicating an ordinal level (of first to ninth levels) of each of the numerical values of "5", "6", and "7" set as a partial authentication target with respect to the authentication information as a whole.

FIG. 5 is a diagram for describing the information arrangement memory 3d.

The information arrangement memory 3d is a memory which temporarily stores an arrangement status of each digit of the authentication information arranged in the information arrangement region AR, and has "arrangement ordinal level", "information content", and "arrangement area". In FIG. 5, an arrow direction indicates a chronological order as an arrangement sequence (a so-called Z-order front-back relation). "Arrangement ordinal level" of "No. 1" to "No. 9" indicates an overall rank (any of first to ninth levels) at which ordinal level the information content is arranged with respect to all digits.

In FIG. 5, a double circle added in the margin indicates that the item is a partial authentication target set as the above-described partial-authentication reference information, and an asterisk indicates that the item is a target for the above-described arrangement exclusion confirmation.

FIG. 6 is a diagram for describing the partial authentication method memory 3e.

The partial authentication method memory 3e is a memory for specifying a partial authentication method arbitrarily selected in advance from among a plurality of types of partial authentication methods with different partial authentication methodologies, and has items of "partial authentication method" and "selected". "Partial authentication method" is an item that defines the authentication method, and has seven types of partial authentication methods in the present embodiment. From among these methods, any one partial authentication method can be selected by user operation.

These seven types of partial authentication methods are set according to a combination status of how two or more elements (two elements or three elements) are combined from among the elements of "arrangement area", "information content", and "arrangement ordinal level (partial rank or overall rank)". A double circle in "selected" indicates that this partial authentication method is the one arbitrarily selected and specified in advance by user operation.

A type of "1" indicates a method of performing partial authentication by combining elements of "arrangement area", "information content", and "arrangement ordinal level (partial rank)". A type of "2" indicates a method of performing partial authentication by combining elements of "arrangement area" and "arrangement ordinal level (partial rank)", and a type of "3" indicates a method of performing partial authentication by combing elements of "information content" and "arrangement ordinal level (partial rank)". Also, a type of "4" indicates a method of performing partial authentication by combining elements of "arrangement area", "information content", and "arrangement ordinal level (overall rank)". Similarly, a type of "5" indicates a method of performing partial authentication by combining elements of "arrangement area" and "arrangement ordinal level (overall rank)", and a type of "6" indicates a method of performing partial authentication by combining elements of "information content" and "arrangement ordinal level (overall rank)". Furthermore, a type of "7" indicates a method of performing partial authentication by combining elements of "arrangement area" and "information content".

As described above, the authentication processing device (tablet terminal device) of the present embodiment is an authentication processing device which performs authentication processing in response to an operation of inputting and arranging a predetermined number of pieces (for example, nine digits) of information forming authentication information (for example, a long passphrase) in a predetermined arrangement region (the information arrangement region AR on the touch display section 5).

The authentication processing device includes: setting means (the CPU 1, the program memory 3a, and the partial authentication region 3c3) which sets, as authentication reference information (partial-authentication reference information), an arrangement status in an arbitrarily specified portion by an information arrangement status in the predetermined arrangement region; detection means (the CPU 1, the program memory 3a, and the information arrangement memory 3d) which detects an arrangement status of the specified portion from an overall arrangement status in the predetermined arrangement region when the operation of inputting and arranging the predetermined number of pieces of information forming the authentication information in the predetermined arrangement region (for example, a drag-and-drop operation from the information list region LT) is performed, and partial authentication means (the CPU 1, the program memory 3a, and partial authentication region 3c3) which performs processing, as partial authentication, of matching the arrangement status of the specified portion detected by the detection means and the arrangement status of the specified portion set as the reference information by the setting means.

Next, the operation concept of the authentication processing device (tablet terminal device) in the present embodiment is described with reference to flowcharts depicted in FIG. 7 to FIG. 10. Here, each function described in these flowcharts is stored in a readable program code format, and operations based on these program codes are sequentially performed.

Also, operations which follow the above-described program code, the operations transmitted via a transmission medium such as a network, can be sequentially performed. That is, by using not only a recording medium but also a program/data externally supplied via the transmission medium can be used to perform operations unique to the present embodiment.

FIG. 7 to FIG. 10 are flowcharts of an operation summary of a feature portion of the present embodiment in an overall operation of the authentication processing device. After exiting these flows of FIG. 7 to FIG. 10, the CPU 1 returns to a main flow (not shown) of the overall operation.

Figure 7:
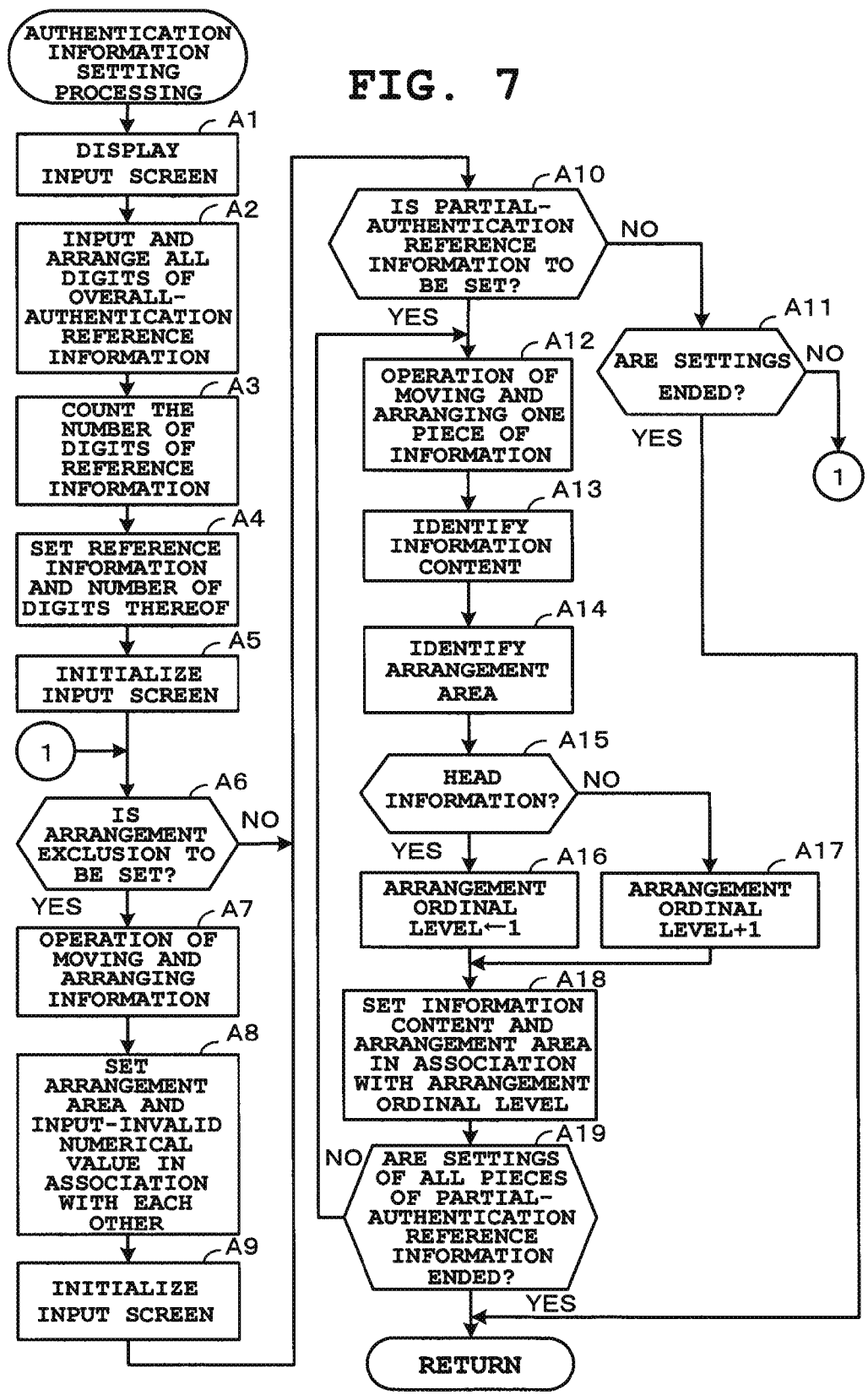
FIG. 7 is a flowchart of processing of setting content of the reference authentication information memory $3c$.

FIG. 7 is a flowchart of processing of setting content of the reference authentication information memory 3c.

Firstly, when authentication information setting processing is specified by user operation, the CPU 1I causes an authentication information input screen as depicted in FIG. 2 to be displayed on the touch display section 5 (Step A1). By using the information list region LT and the information arrangement region AR in this input screen, the user performs an operation of selecting a numerical value part P from the information list region LT and sequentially moving the numerical value part P from the first digit to the information arrangement region AR (a touch operation corresponding to a drag-and-drop mouse operation) to input numerical values forming overall-authentication reference information, and then operates the enter button OK (Step A2).

After that, the CPU 1 counts the number of digits of the overall-authentication reference information inputted and arranged in the information arrangement region AR (Step A3), and performs processing of setting the overall-authentication reference information and the number of digits thereof in the overall authentication region 3c1 of the reference authentication information memory 3c (Step A4). The CPU 1 then initializes the authentication information input screen to the original state (a vacant state before input and arrangement) (Step A5).

Next, the CPU 1 judges whether an instruction for setting arrangement exclusion information has been made by user operation (Step A6), judges whether an instruction for setting partial-authentication reference information has been made (Step A10), and judges whether an instruction for ending all settings has been made (Step A11). Here, if an instruction for setting arrangement exclusion information has been made by user operation (YES at Step A6), the CPU 1 proceeds to the next Steps A7 to A9.

In this case, when an operation of moving the numerical values to the information arrangement region AR (Step A7), that is, when the user performs the operation of selecting a numerical value part P to be set as an input-invalid target from the information list region LT and moving the selected part to an arrangement area in the information arrangement region AR in the initial state where no information is arranged in the information arrangement region AR, the CPU 1 performs processing of setting information obtained by associating the arrangement area and the numerical value as an input-invalid target with each other in the arrangement exclusion confirmation region 3c2 of the reference authentication information memory 3c (Step A8). The CPU 1 then initializes the authentication information input screen to the original state (a vacant state before input and arrangement) (Step A9).

Also, when an instruction for setting partial-authentication reference information has been made by user operation (YES at Step A10), the CPU 1 proceeds to the next Steps A12 to A19. In this case, when an operation of moving a numerical value, which is one piece of the partial-authentication reference information, to the information arrangement region AR (Step A12), that is, when the user performs the operation of selecting a numerical value part P as a partial authentication target from the information list region LT and moving the selected part to an arrangement area in the information arrangement region AR, the CPU 1 identifies which information (numerical value) has been specified as the partial authentication target (Step A13) and identifies which arrangement area has been specified as the partial authentication target (Step A14).

The CPU 1 then judges whether head information for partial authentication has been arranged (Step A15). If the head information has been arranged (YES at Step A15), the initial value of the arrangement ordinal level (partial rank) is set as "1" (Step A16). If information other than the head information has been arranged (NO at Step A15), the CPU 1 performs processing of adding "1" to the arrangement ordinal level (partial rank) (Step A17).

In this manner, after obtaining "arrangement ordinal level (partial rank)", the CPU 1 performs processing of setting "information (numerical value) content" identified at Step A13, "arrangement area" identified at Step A14, and "arrangement ordinal level (partial rank)" in association with each other in the partial authentication region 3c3 of the reference authentication information memory 3c (Step A18).

When setting the one piece of the partial-authentication reference information is finished, the CPU 1 judges whether settings of all pieces of the partial-authentication reference information are ended (Step A19). Hereinafter, the CPU 1 repeats the above-described operation by returning to Step A12 until settings are ended.

When all pieces of the partial-authentication reference information have been inputted and arranged (YES at Step A19) the CPU 1 exits the flow of FIG. 7. Additionally, if an instruction for not setting partial-authentication reference information has been made by user operation (NO at Step A10), the CPU 1 proceeds to Step A11. Then, if an instruction for ending all settings has been made (YES at Step A11), the CPU 1 exits the flow of FIG. 7. If not (NO at Step A11), the CPU 1 returns to Step A6.

Figure 8:
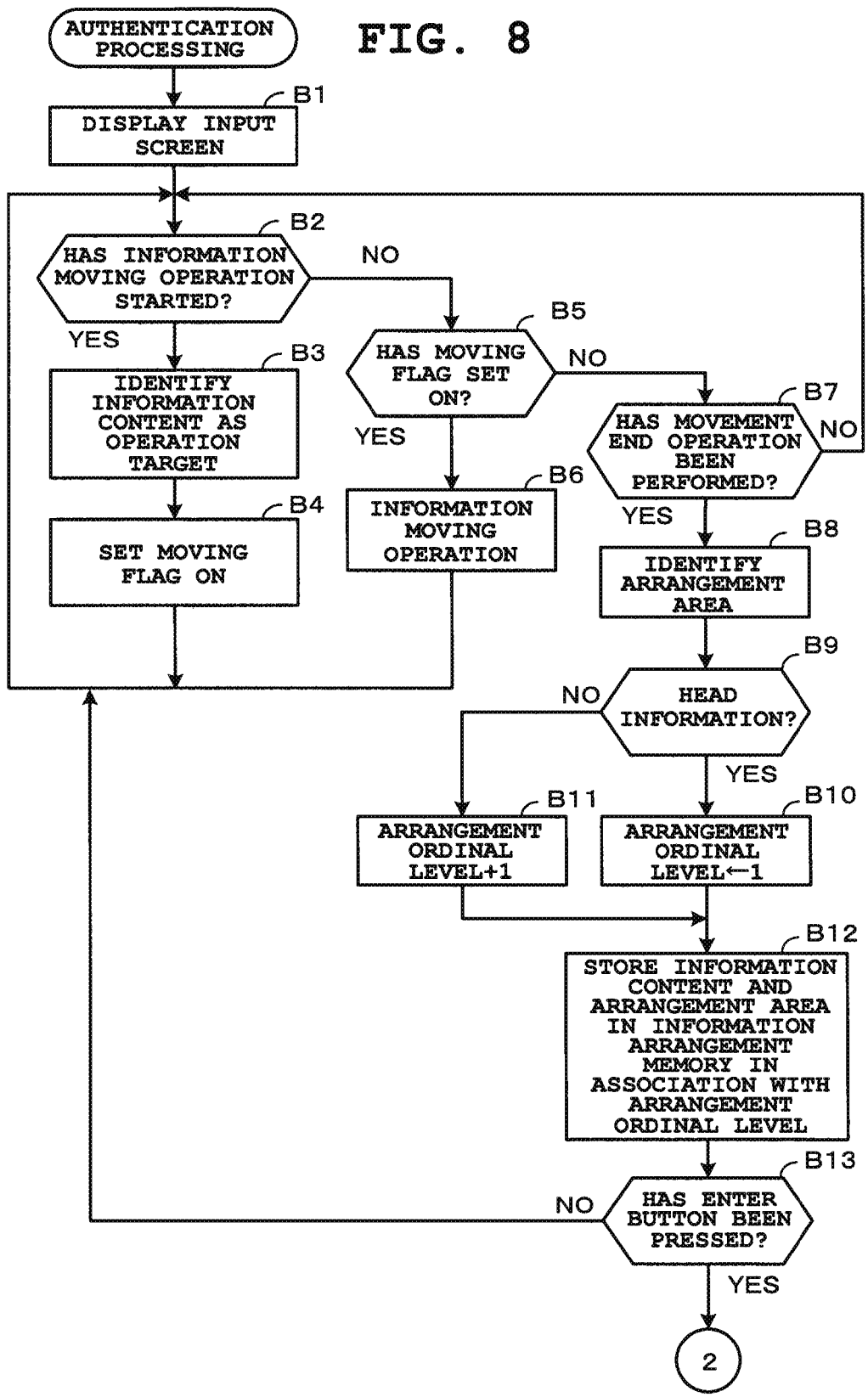
FIG. 8 is a flowchart of authentication processing.
Figure 9:
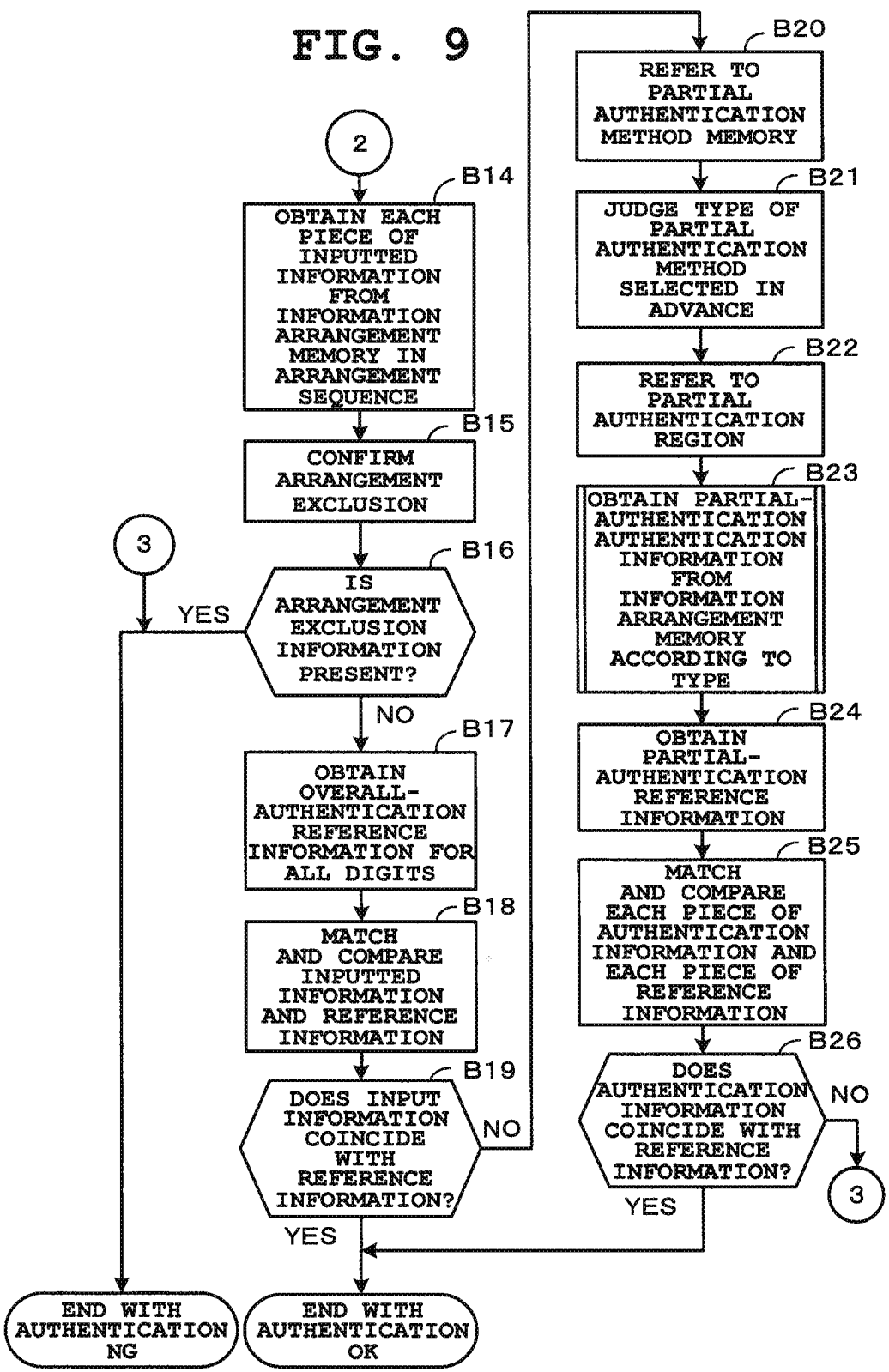
FIG. 9 is a flowchart of an operation subsequent to FIG. 8.

FIG. 8 and FIG. 9 are flowcharts of authentication processing.

Firstly, the CPU 1 causes an authentication information input screen as depicted in FIG. 2 to be displayed on the touch display section 5 (Step B1 of FIG. 8). By using the information list region LT and the information arrangement region AR in this input screen, the user performs an operation of selecting numerical value parts P as arrangement targets from the information list region LT and touching and moving these parts to the information arrangement region AR to input and arrange authentication information for all digits.

For example, to sequentially arrange "538916274" as authentication information for all digits (nine digits) one by one, the CPU 1 performs an operation of initially touching the head numerical value part P of "5" and moving the part to the information arrangement region AR, arranging the part in the arrangement area of this information arrangement region AR, and then releasing the touch.

Here, the CPU 1 judges whether an information moving operation has started (whether any numerical value part P has been touched) (Step B2), judges whether a moving flag (not shown) has been set ON (whether the numerical part P is moving) (Step B5), and judges whether a movement end operation has been performed (whether the touch has been released from the numerical value part P) (Step B7).

Here, upon detection of the start of an information moving operation (YES at Step B2), the CPU 1 identifies information content (numerical value of "5") of the numerical value part P subjected to a touch operation (Step B3), and then sets the moving flag (not shown) ON to indicate that the numerical value part P is moving (Step B4).

Then, upon detection of the moving flag being ON (YES at Step B5), the CPU 1 continues the processing of moving the numerical value part P (Step B6). Then, upon detection of a movement end operation (YES at Step B7), the CPU 1 identifies the arrangement area of the information arrangement region AR where the numerical value part P is arranged (Step B8), and judges whether head information forming authentication information has been arranged (Step B9).

If the head information has been arranged (YES at Step B9), the initial value of the arrangement ordinal level (overall rank) is set as "1" (Step B10). If information other than the head information has been arranged (NO at Step B9), the CPU 1 performs processing of adding "1" to the arrangement ordinal level (overall rank) (Step B11).

In this manner, after obtaining "arrangement ordinal level (overall rank)", the CPU 1 performs processing of storing "information content" identified at Step B3 and "arrangement area" identified at Step B8 in the information arrangement memory 3d with respect to the "arrangement ordinal level (overall rank)" (Step B12).

The CPU 1 then judges whether the enter button OK has been operated, that is, whether authentication information for all digits (nine digits) has been arranged (Step B13). Initially, only the head numerical value has been set (NO at Step B13), whereby the CPU 1 returns to Step B2, waiting for the next information moving operation.

Whereas, when the authentication information for all digits (nine digits) has been arranged and the enter button OK has been operated (YES at Step B13), the CPU 1 proceeds to the flow of FIG. 9, and obtains information of "arrangement ordinal level", "information content" and "arrangement area" from the information arrangement memory 3d (Step B14).

Then, prior to authentication processing, the CPU 1 performs processing of referring to the arrangement exclusion confirmation region 3c2 of the reference authentication information memory 3c and confirming whether information relevant to arrangement exclusion is included in the obtained information (Step B15).

For example, when the arrangement area A and an input-invalid target numerical value of "1" are associated with each other as arrangement exclusion information, the CPU 1 judges whether the numerical value of "1" is arranged in the arrangement area A. As a result, when the numerical value of "1" is arranged in the arrangement area A, that is, when arrangement exclusion information is included (YES at Step B16), the CPU 1 takes the authentication result as negative (authentication NG) to invalidate the entire input of the authentication information arranged in the information arrangement region AR, and then exits the flows of FIG. 8 and FIG. 9.

When a numerical value other than the numerical value of "1" is arranged in the arrangement area A, that is, when arrangement exclusion information is not included (NO at Step B16), the CPU 1 proceeds to all-digits authentication processing (Steps B17 to B19). First, the CPU 1 accesses the overall authentication region 3c1 of the reference authentication information memory 3c to obtain overall-authentication reference information (for all digits) (Step B17), then matches and compares the obtained reference information and "information content" obtained for "arrangement ordinal level" from the information arrangement memory 3d (Step B18), and then judges whether all digits coincides with the reference information (Step B19).

As a result, if all-digits coincidence has been detected and it has been confirmed that correct authentication information has been inputted and arranged (YES at Step B19), the overall authentication result is positive (authentication OK), and the CPU 1 exits the flows of FIG. 8 and FIG. 9.

On the other hand, as a result of overall authentication, if it is detected that not all of the digits coincide with the reference information or that even one digit does not coincide with the reference information (NO at Step B19), the result of overall authentication is negative (authentication NG). On condition that the result of overall authentication is negative, the CPU 1 proceeds to partial authentication processing (Steps B20 to B26). Firstly, the CPU 1 refers to the partial authentication method memory 3e (Step B20) to judge the type of the partial authentication method selected and specified in advance (Step B21).

The CPU 1 then refers to the partial authentication region 3c3 of the reference authentication information memory 3c (Step B22) and obtains the partial-authentication authentication information from the information arrangement memory 3d according to the judged type of the partial authentication method (Step B23).

Figure 10:
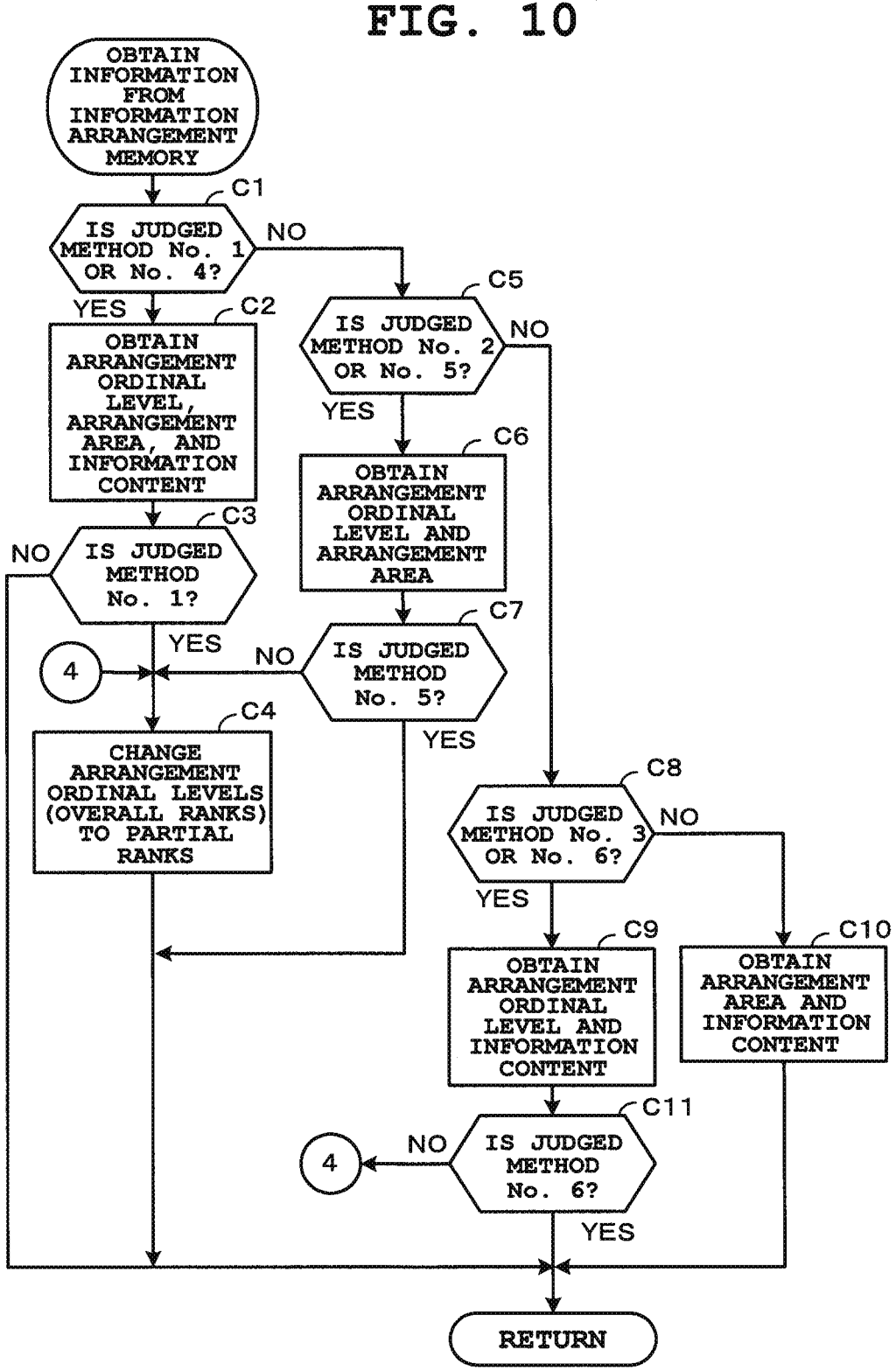
FIG. 10 is a flowchart for describing details of processing of obtaining information from the information arrangement memory $3d$ at partial authentication.

FIG. 10 is a flowchart for describing details f processing of obtaining partial-authentication authentication information from the information arrangement memory 3d according to the type of the partial authentication method (Step B23 of FIG. 9).

The CPU 1 firstly judges whether the judged type of the partial authentication method is "No. 1" or "No. 4" in the partial authentication method memory 3e (Step C1). When the selected partial authentication method is "No. 1" or "No. 4" (YES at Step C1), the CPU 1 refers to the partial authentication region 3c3 of the reference authentication information memory 3c and obtains "arrangement ordinal level", "arrangement area", and "information content" as elements relevant to partial authentication reference information from the information arrangement region AR (Step C2).

For example, in the case where the settings in the partial authentication region 3c3 are as depicted in FIG. 4, the CPU 1 obtains "information contents", "arrangement areas" and "arrangement ordinal levels" as elements, and specifically obtains "information contents" of "5", and "7", "arrangement areas" of "G", "F", and "B", and "arrangement ordinal levels" of "1", "6", and "8" from the information arrangement region AR. Then, if the judged method is "No. 1" (YES at Step C3), the CPU 1 performs processing of changing "arrangement ordinal levels" to partial ranks (Step C4). In this case, "arrangement ordinal levels" of "1", "6", and "8" with respect to "information contents" of "5", "6", and "7" and "arrangement areas" of "G", "F", and "B" are changed to "1", "2", and "3", respectively.

Also, when the judged type of the partial authentication method is "No. 2" or "No. 5" (YES at Step C5), the CPU 1 obtains "arrangement ordinal level" and "arrangement area" as elements relevant to partial-authentication reference information from the information arrangement region AR (Step C6). For example, in the case of FIG. 4, the CPU 1 obtains "arrangement areas" of "G", "F", and "B" and "arrangement ordinal levels" of "1", "6", and "8" from the information arrangement region AR. Then, if the judged method is "No. 2" (NO at Step C7), the CPU 1 performs processing of changing "arrangement ordinal levels" to partial ranks (Step C4).

Similarly, when the judged type of the partial authentication method is "No. 3" or "No. 6" (YES at Step C8), the CPU 1 obtains "arrangement ordinal level" and "information content" as elements relevant to partial-authentication reference information from the information arrangement region AR (Step C9). For example, in the case of FIG. 4, the CPU 1 obtains "information contents" of "5", "6", and "7" and "arrangement ordinal levels" of "1", "6", and "8".

Then, when the judged method is "No. 3" (NO at Step C11), the CPU 1 performs processing of changing "arrangement ordinal levels" to partial ranks (Step C4). When the judged type of the partial authentication method is "No. 7" (NO at step C8), the CPU 1 obtains "arrangement area" and "information content" as elements relevant to partial-authentication reference information from the information arrangement region AR (Step C10).

As described above, the CPU 1 obtains the partial-authentication authentication information from the information arrangement memory 3d according to the type of the partial authentication method (Step B23 of FIG. 9). Then, the CPU 1 matches and compares each piece of the partial-authentication authentication information obtained from the information arrangement memory 3d and each piece of the partial-authentication reference information obtained from the partial authentication region 3c3 (Step B25).

As a result, the CPU 1 judges whether each piece of the partial-authentication authentication information respectively coincides with each piece of the partial-authentication reference information, that is, whether all pieces of the partial-authentication authentication information coincide with the partial-authentication reference information (Step B26). As a result of partial authentication, when it is detected that even one piece does not coincide with the partial-authentication reference information (NO at Step B26), the CPU 1 takes the authentication result as authentication NG, and exits the flows of FIG. 8 and FIG. 9. Also, as a result of partial authentication, when all pieces coincide with the partial-authentication reference information (YES at Step B26), the CPU 1 judges authentication OK in partial authentication even though the result of overall authentication is authentication NG, and exits the flows of FIG. 8 and FIG. 9.

For example, when the settings of the partial authentication region 3c3 are as depicted in FIG. 4, when the type of the partial authentication method is "No. 1", authentication OK is judged if the numerical value of "5" is initially arranged in the arrangement area G, the numerical value of "6" is next arranged in the arrangement area F, and the numerical value of "7" is lastly arranged in the arrangement area B.

Also, when the type of the partial authentication method is "No. 2", regardless of "information content", authentication OK is judged if any information is initially arranged in the arrangement area G, any other information is next arranged in the arrangement area F, and any other information is lastly arranged in the arrangement area B. When the type of the partial authentication method is "No. 3", regardless of "arrangement area", authentication OK is judged if the numerical value of "5" is initially arranged, the numerical value of "6" is next arranged, and the numerical value of "7" is lastly arranged.

In the case of FIG. 4, "partial rank" is taken as an example of "arrangement ordinal level" of the partial authentication region 3c3. In the case of "overall rank", for example, "arrangement ordinal level (1)", "arrangement ordinal level (6)", and "arrangement ordinal level (8)" are set as "overall ranks". If the type of the partial authentication method is "No. 4", authentication OK is judged if the numerical value of "5" is firstly arranged in the arrangement area G, the numerical value of "6" is sixthly arranged in the arrangement area F, and the numerical value of "7" is eighthly arranged in the arrangement area B, in the authentication information with a nine-digits structure as a whole.

Similarly, when the type of the partial authentication method is "No. 5", regardless of "information content", authentication OK is judged if any information is arranged in the firstly arrangement area G, any other information is sixthly arranged in the arrangement area F, and any other information is eighthly arranged in the arrangement area B. When the type of the partial authentication method is "No. 6", regardless of "arrangement area", authentication OK is judged if the numerical value of "5" is firstly arranged, the numerical value of "6" is sixthly arranged, and the numerical value of "7" is eighthly arranged.

On the other hand, when the type of the partial authentication method is "No. 7", regardless of "arrangement ordinal level", authentication OK is judged if the numerical value of "5" is arranged in the arrangement area G, the numerical value of "6" is arranged in the arrangement area F, and the numerical value of "7" is arranged in the arrangement area B.

As described above, in the present embodiment, in a state where an arrangement status of a specified portion in the information arrangement region AR is set in advance as partial-authentication reference information in the reference authentication information memory 3c, when an operation of inputting and arranging authentication information in the information arrangement region AR is performed, the CPU 1 detects an arrangement status of a specified portion from an overall arrangement status in the information arrangement region AR, and performs, as partial authentication, processing of matching the detected arrangement status of the specified portion and the arrangement status of the specified portion set as partial-authentication reference information. As a result, even when lengthy authentication information is inputted and arranged in order to ensure high-level security, what is required is to memorize only a partial arrangement status. Accordingly, a user can input and arrange the authentication information without burden, and both security and operability can be satisfied.

When "arrangement area" and "arrangement ordinal level" are set as partial-authentication reference information, the arrangement status indicating in which area and at which ordinal level any information has been arranged as an arrangement status of the specified portion in the information arrangement region AR, is detected for partial authentication. Accordingly, all the user has to memorize is merely the arrangement status of "arrangement area" and "arrangement ordinal level" when inputting and arranging the authentication information, and whereby the user can input the authentication information without burden.

When three elements, that is, "arrangement area", "arrangement ordinal level", and "information content", are set as authentication reference information, the arrangement status indicating which information content has been arranged as well as in which area and at which ordinal level the information has been arranged as an arrangement status of the specified portion in the information arrangement region AR, is detected for partial authentication. Accordingly, security can be more enhanced compared with the case of two elements. Even when one element is further added, the burden on the user is minimal.

When "information content" and "arrangement ordinal level" are set as partial-authentication reference information, the arrangement status indicating which information content has been arranged and at which ordinal level the information has been arranged as an arrangement status of the specified portion in the information arrangement region AR, is detected for partial authentication. Accordingly, all the user has to memorize is merely the arrangement status of "information content" and "arrangement ordinal level" when inputting and arranging the authentication information, and whereby the user can input the authentication information without burden.

As "arrangement ordinal level", a partial rank can be set indicating an ordinal level of each target in an alignment of partial authentication targets of "information content" or "arrangement area". Accordingly, all the user has to memorize is merely the arrangement ordinal levels of the partial authentication targets, and the burden on the user is minimal.

As "arrangement ordinal level", an overall rank can be set indicating an ordinal level of each target in an alignment of a predetermined number (for example, 9 digits) of pieces of authentication information as a whole. Accordingly, the arrangement ordinal levels can be memorized as an overall flow, which is easy to remember.

When "information content" and "arrangement area" are set as partial-authentication reference information, the arrangement status indicating which information content has been arranged and in which area the information has been arranged as an arrangement status of the specified portion in the information arrangement region AR, is detected for partial authentication. Accordingly, all the user has to memorize is merely the arrangement status of "information content" and "arrangement area" when inputting and arranging the authentication information, and whereby the user can input the authentication information without burden.

Partial authentication starts on condition that the processing result of overall authentication is negative. As a result, even though authentication NG is judged in overall authentication, authentication OK can be judged in partial authentication without inputting all digits of the authentication information again. Accordingly, operability is significantly improved.

When information prohibited to be arranged in an area of the arrangement areas is arranged in the area, the entire input of the authentication information is judged as invalid. Accordingly, security is further improved.

Partial authentication is performed according to any partial authentication method selected in advance from among the plurality of types of partial authentication methods with different partial authentication methodologies. Accordingly, the use can select the best partial authentication method for the user in view of both of security and operability.

When inputting the authentication information, the user simply performs an operation of moving information in the information list region LT to the information arrangement region AR for arrangement. Therefore, it is reliable and easy to input the authentication information.

After the predetermined number of pieces of information forming the authentication information are arranged in the information arrangement area AR, the arrangement status is detected and authentication processing is performed. As a result, even if a third party steals a glance at or secretly photographs the contents of the information arrangement region AR at the stage of finishing arrangement of all pieces, the third party cannot know the arrangement ordinal levels.

In the above-described embodiment, partial authentication starts on condition that the processing result of overall authentication is negative. Alternatively, if authentication OK is judged as a result of partial authentication, overall authentication may be omitted.

In the above-described embodiment, the information arrangement region AR is in a three-by-three matrix structure. Alternatively, the size may be increased according to the number of digits of the authentication information. Also, the array shape is not limited to the matrix structure, and can be arbitrarily set. For example, a plurality of arrangement areas may be linearly or annularly arrayed.

In the above-described embodiment, each piece of information is selected from the information list region LT, and moved and arranged in the information arrangement region AR. Alternatively, the information may be arranged in the information arrangement region AR by an operation of a touch key (a software key) on the touch display section 5 or a press key (a hardware key) on a keyboard. Furthermore, the information may be arranged in the information arrangement region AR by an operation of inputting by handwriting in the arrangement area. Any inputting and arranging means can be used.

Also, in the above-described embodiment, one piece of information is arranged in one arrangement area in the information arrangement region AR. Alternatively, for example, two pieces of information may be inputted and arranged in one arrangement area each with a time delay, or two pieces of information may be inputted and arranged at the same time. In this case, the plurality of pieces of information inputted and arranged in one arrangement area may be displayed in parallel.

Furthermore, in the above-described embodiment, the present invention is applied to a tablet terminal device as an authentication processing device. However, this is not limited thereto. The present invention may be applied to a portable telephone such as a smartphone, a personal computer, a PDA (a personal digital assistant), a digital camera, or a music player, or the like.

Still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An authentication processing device in which a plurality of divided input areas are displayed and which performs authentication processing in response to information inputted in each of the plurality of divided input areas, the device comprising:
   a memory including a setting section which stores and sets in advance, in association with each of a predetermined number of a plurality of specified input areas designated in advance as target areas for partial authentication in the plurality of divided input areas, an individual piece of information to be inputted in each of the plurality of specified input areas, where the predetermined number of the plurality of specified input areas are smaller than the plurality of divided input areas;
   a detecting section of a touch panel which detects inputs by a user and obtains, as target areas for partial authentication, only information inputted in the plurality of specified input areas without obtaining information inputted in areas other than the plurality of specified input areas in the plurality of divided input areas when information is sequentially inputted in the each of the plurality of divided input areas; and
   a processor configured to receive the individual pieces of information to be inputted in each of the plurality of specified input areas from the setting section of the memory and information inputted in the plurality of specified input areas from the detecting section of the touch panel and operate as a partial authenticating section which performs, as authentication processing of partial authentication, processing of matching a piece of the information inputted in each of the plurality of specified input areas detected by the detecting section of the touch panel and the individual piece of information stored in association with each of the plurality of specified input areas set in advance by a user and stored in the setting section of the memory and authenticating in response to determining that the piece of the information inputted in each of the plurality of specified input areas matches the individual piece of information stored in association with each of the plurality of specified input areas.

2. The authentication processing device according to claim 1, wherein the setting section further stores and sets in advance, in association with each of the plurality of specified input areas, a sequence in which information is to be inputted in the each of the plurality of specified input areas and
wherein the processor configured to operate as the partial authenticating section further obtains a sequence in which information is inputted in each of the plurality of specified input areas, and further performs the authentication processing based on whether the sequence in which information is inputted in each of the plurality of specified input areas coincides with the sequence stored in advance.

3. The authentication processing device according to claim 1, wherein the processor configured to operate as the partial authenticating section performs the processing of matching, with only information inputted in the each of the plurality of specified input areas as a target, regardless of the information inputted in the areas other than the plurality of specified input areas in the plurality of divided input areas.

4. The authentication processing device according to claim 1,
wherein the processor configured to operate as the partial authenticating section performs authentication processing by partial authentication when receiving input information in all of the plurality of divided input areas is ended.

5. A authenticating method in which a plurality of divided input areas are displayed and which a processor authenticates validity of input information based on information inputted in each of the plurality of divided input areas, the method comprising:
a storing step of storing in advance, in association with each of a predetermined number of a plurality of specified input areas designated in advance by a user in the plurality of divided input areas, an individual piece of information to be inputted in the each of the plurality of specified input areas in a memory, where the predetermined number of the plurality of specified input areas are smaller than the plurality of divided input areas;
a receiving step of sequentially receiving information in the each of the plurality of divided input areas from user input detected by a touch panel;
a temporarily storing step of temporarily storing in a memory the information sequentially received in the each of the plurality of divided input areas; and
an authenticating step of the processor obtaining from the touch panel only information inputted in the each of the plurality of specified input areas without obtaining information inputted in areas other than the plurality of specified input areas in the plurality of divided input areas, receiving the individual piece of information to be inputted in each of the plurality of specified input areas from the memory, and performing authentication processing of validity of input information by determining that each piece of information inputted in the each of the plurality of specified input areas matches the individual piece of information stored in advance in association with the each of the plurality of specified input areas.

6. The authenticating method according to claim 5, wherein the authenticating step comprises the processing device performing authentication processing, with only information inputted in the each of the plurality of specified input areas as a target, regardless of the information inputted in the areas other than the plurality of specified input areas in the plurality of divided input areas.

7. The authenticating method according to claim 5, wherein the storing step further comprises storing in advance, in association with each of the plurality of specified input areas, a sequence in which information is to be inputted in each of the plurality of specified input areas, and temporarily storing a sequence in which information is inputted in the each of the plurality of specified input areas, and
wherein the authenticating step further comprises obtaining the sequence in which information is inputted in the each of the plurality of specified input areas, and performing the authentication processing based on whether the sequence in which information is inputted in the each of the plurality of specified input areas coincides with the sequence stored in advance.

8. The authenticating method according to claim 5, wherein the partial authenticating step performs the authentication processing when receiving input information in all of the plurality of divided input areas is ended.

9. The authenticating method according to claim 5, wherein the receiving step comprises receiving different pieces of information in the respective plurality of divided input areas via a sequential and arbitrary selection of a plurality of different pieces of information prepared in advance.

10. A authenticating method in which a plurality of divided input areas are displayed and which a processor authenticates validity of input information based on information inputted in each of the plurality of divided input areas, the method comprising:
a storing step of storing in advance, a predetermined number of pieces of specific information designated in advance by a user among a plurality of pieces of information to be inputted in the respective plurality of divided input areas and an input sequence of the predetermined number of pieces of specific information designated in advance by a user in a memory, where the predetermined number of pieces of specific information are smaller than the plurality of pieces of information;
a receiving step of sequentially receiving a piece of information of the plurality of pieces of information in the each of the plurality of divided input areas from user input detected by a touch panel;
a temporarily storing step of temporarily storing in a memory an input order of the plurality of pieces of information sequentially received in the respective plurality of divided input areas; and
an authenticating step of the processor obtaining from the touch panel only an input sequence in which the predetermined number of pieces of specific information are respectively inputted among the plurality of pieces of information inputted in the respective plurality of divided input areas, regardless of input order of information other than the predetermined number of pieces of specific information, receiving the predetermined number of pieces of specific information to be inputted in the respective plurality of divided input areas and the input sequence from the memory, and performing authentication processing of validity of input information by determining that the input sequence of the predetermined number of pieces of specific information matches the input sequence stored in advance.

11. The authenticating method according to claim 10, wherein the authenticating step comprises performing the authentication processing when receiving input information in all of the plurality of divided input areas is ended.

12. The authenticating method according to claim 10, wherein the receiving step receives different pieces of information in the respective plurality of divided input areas via a sequential and arbitrary selection of a plurality of different pieces of information prepared in advance.

* * * * *